Figure 1:
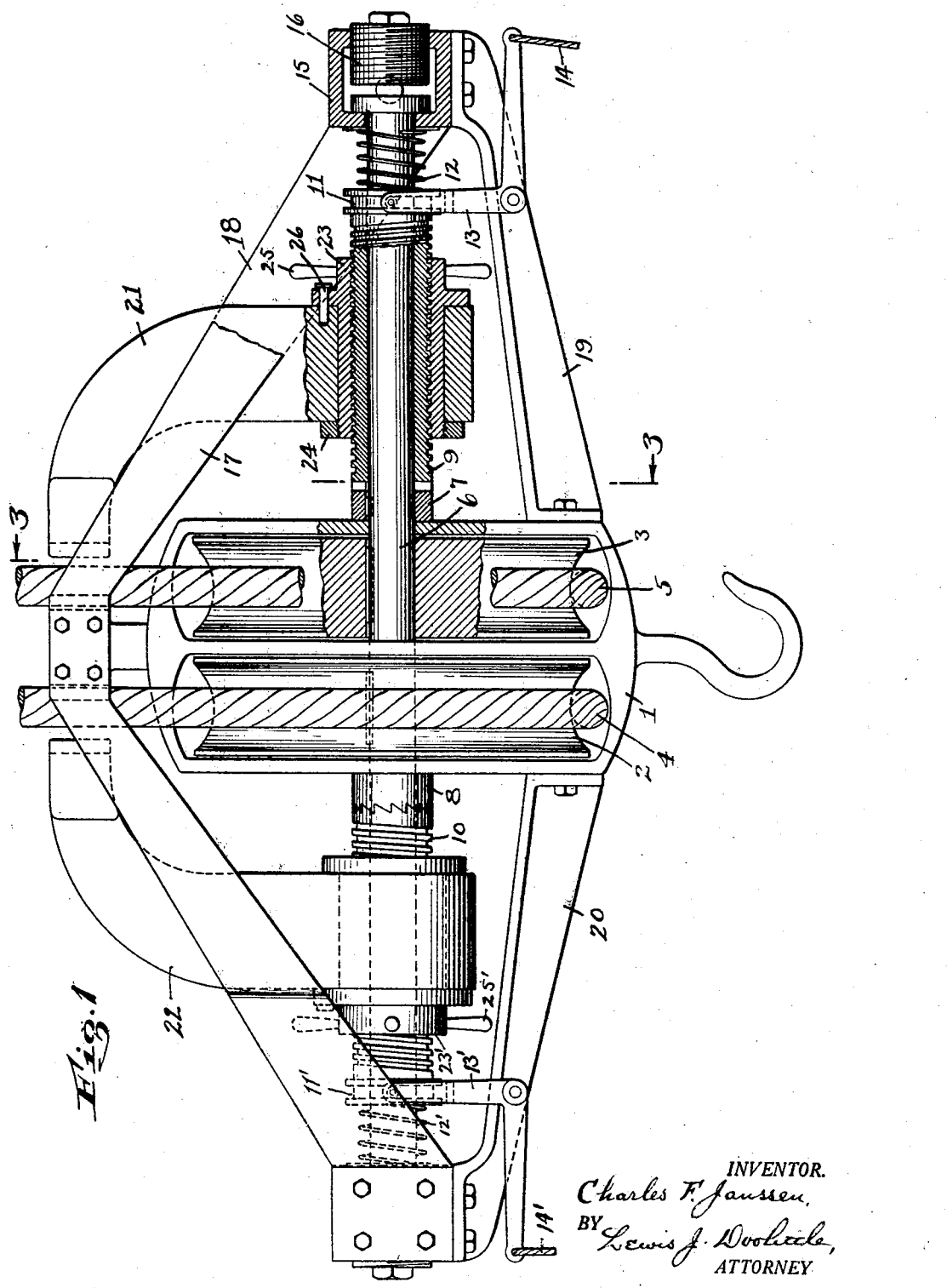

Feb. 24, 1931.  C. F. JANSSEN  1,794,176
TACKLE BLOCK
Filed Jan. 24, 1930  2 Sheets-Sheet 1

INVENTOR.
Charles F. Janssen.
BY Lewis J. Doolittle,
ATTORNEY

Feb. 24, 1931.    C. F. JANSSEN    1,794,176
TACKLE BLOCK
Filed Jan. 24, 1930    2 Sheets-Sheet 2
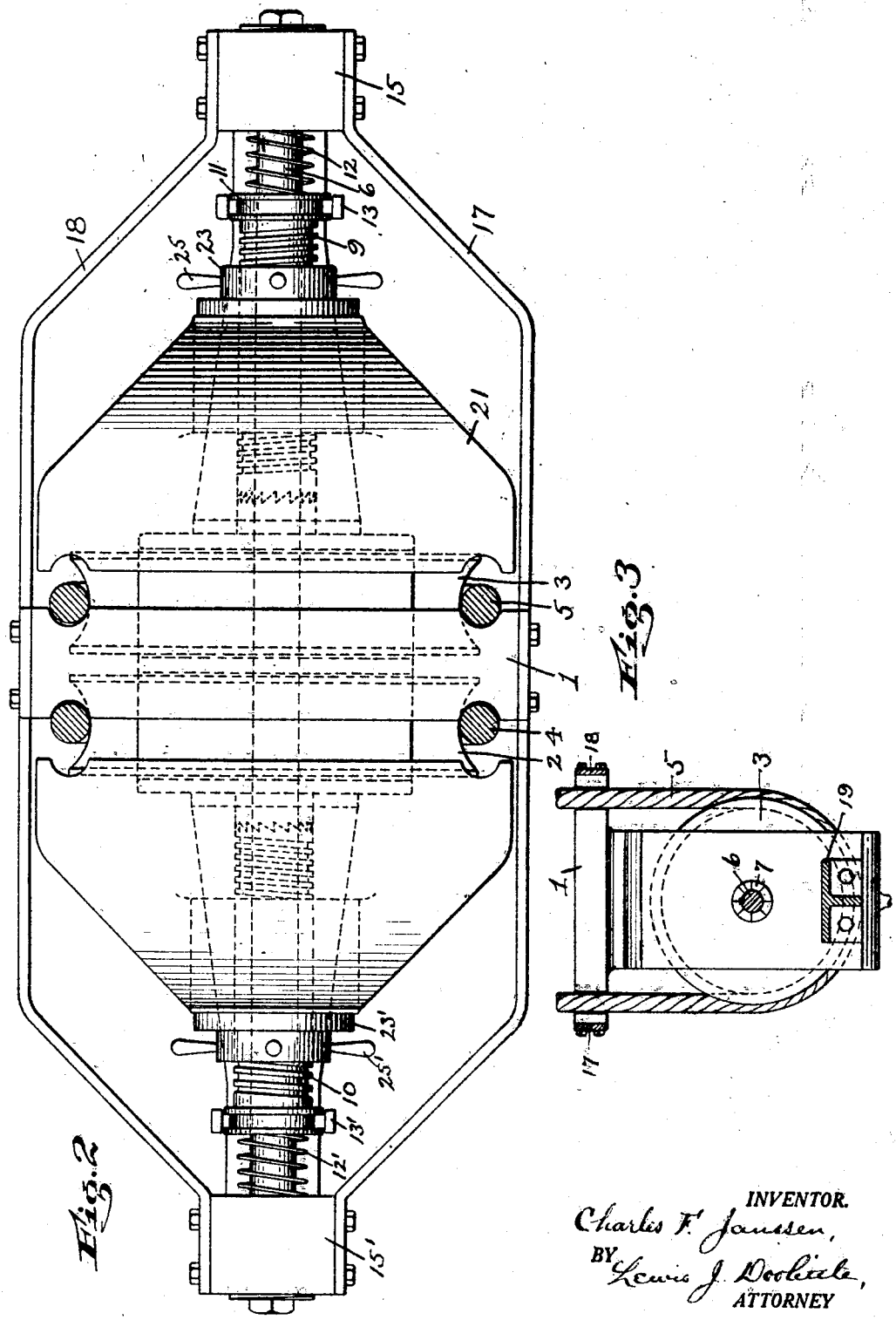
INVENTOR.
Charles F. Janssen,
BY Lewis J. Doolittle,
ATTORNEY Patented Feb. 24, 1931

1,794,176

UNITED STATES PATENT OFFICE

CHARLES F. JANSSEN, OF NEW YORK, N. Y.

TACKLE BLOCK

Application filed January 24, 1930. Serial No. 422,970.

This invention relates to a mechanical device used for transmitting power, known as a tackle-block or block and tackle, which comprises one or more grooved pulleys mounted in a suitable support or frame around which a rope or chain is passed.

The object of the present invention is to provide a construction which automatically locks the rope when a break in the same occurs and holds the device in position and prevents anything supported thereby from falling. As these devices are frequently used for raising temporary platforms in connection with building operations upon which the workmen stand while working, the breaking of one of the ropes would result in serious injury if the platform should fall. Also, when the device is used in raising steel beams, etc., to great height, breaking of the rope causes the same to fall, with resultant damage and possible loss of life, as will be readily appreciated. The object of my invention is to prevent such damage in the event of breakage of the rope by preventing the falling of the platform, etc., supported thereby by automatically locking the broken rope and holding the same from further movement.

To accomplish this result, I provide gripping jaws which are automatically caused to grip the rope upon movement of the same in a direction reverse to that which it normally has to raise the load and hold the same against movement in such reverse direction. I also provide means for permitting such reverse movement for lowering the load and also for releasing the same from the gripping jaws, all of which will be described more fully in connection with the description of the embodiment of my invention illustrated in the accompanying drawings. In the drawings, like parts in the several views have been given the same reference numeral.

Fig. 1 is a side elevation, partly in section and partly broken away, illustrating a tackle block embodying my invention; Fig. 2 is a plan view of the same; Fig. 3 is a section, in reduced scale, taken on the line 3—3 of Fig. 1.

In the device as shown, two pulleys are used in the block, but it will be understood that any number may be used as required. Also, it is not necessary to explain the operation of these block and tackle devices as the same is well understood.

A tackle block frame is shown at 1 carrying the pulleys 2 and 3, around which the rope is passed, as shown at 4 and 5, respectively. This rope is continuous but the sections of the same passing around the two pulleys 2 and 3 is indicated at 4 and 5.

The pulleys 2 and 3 are carried by and keyed upon a shaft 6 and clutch members 7 and 8 are also keyed upon the shaft 6 on either side of the frame 1. These clutch members 7 and 8 are provided with teeth on their outer ends which are adapted and positioned to engage with corresponding teeth on the adjacent ends of the worm or screw members 9 and 10, respectively, which worm members are slidably and rotatively mounted upon the shaft 6. The outer ends, or ends opposite the toothed ends of these worm members 9 and 10 are provided with annularly grooved end portions 11 and 11'. The threads of the worm members 9 and 10 are, respectively, right and left hand, the purpose of which will appear hereinafter. As the construction and operation of the right and left ends of the device is the same, it will be necessary to specifically refer only to the right end.

A spring 12 engages the end of the worm member 9 and normally tends to move the same inwardly. A bell-crank lever 13 is provided with a yoke shaped upper end carrying pins engaging in the annular grooved end of the worm 9.

An operating rope or other suitbale means, indicated at 14, is provided for operating the lever 13 to cause the worm 9 to slide to the right against the action of the spring 12. This movement carries the parts associated with the worm 9 and releases the clutch engagement between the clutch member 7 and the worm clutch end 9.

Supports for the outer ends of the shaft 6 are provided, as shown for the right end at 15, this support also serving as an abutment for the spring 12. A plug 16 and a suitable bearing for the end thrust of the shaft 6 is also provided in the support 15, as shown.

Front and rear upper frame members are shown at 17 and 18, respectively, and right and left frame members, 19 and 20, respectively, on the lower side connect the supports at the outer ends of the shaft 6 with the pulley frame 1, as shown in Figs. 1 and 2.

Right and left gripping jaws, 21 and 22, are formed at their upper ends to grip the ropes 4 and 5 between these jaws and the upper portion of the frame 1 when the same are closed. In the drawings, these jaws are shown in their open position and are carried by bearing sleeves, such as shown at 23 for the right jaw 21. This sleeve is threaded upon the worm member 9 and is provided with a flange on one side and a retaining nut 24 on the opposite side of the jaw end 21. Handles, such as shown at 25, are provided for turning this sleeve 23 on the worm 9 and a locking means, such as the pin 26, which may be removed to leave the sleeve free to be turned, extends through the flange on the sleeve 23 into an opening in the jaw 21. The jaws 21 and 22 may be moved longitudinally but are prevented from rotation by the front and rear frame members, 17 and 18, as will be seen by reference to Fig. 2.

With the parts in the position as shown in the drawings, the device is raised by moving the rope 4—5 upwardly, on the side shown in Fig. 1, turning the pulleys 2 and 3, shaft 6 and clutch members 7 and 8 correspondingly. The clutch teeth on 7 and 9 and on 8 and 10 slide past each other, forcing the worm and associated parts to the right and left, respectively, against the springs 12. Should the rope be released or broken, the pulleys 2 and 3 start to turn in the reverse direction, the clutch faces of members 7 and 9 and of 8 and 10 engaging and turning the worms 9 and 10, respectively, moving the sleeves 23 and the gripping jaws 21 and 22 inwardly, causing the upper ends thereof to grip the rope and prevent further movement of the same and, consequently, preventing the load carried by the device from falling.

To release the clutch, the operating member 14 is pulled downwardly, swinging the bell crank lever 13 and moving the worm 9, together with the jaw 21, to the right, releasing the rope 5 and disengaging the clutch faces on members 7 and 9, permitting the operation in the reverse direction to lower the block 1. A like operation of the lever 13′ by the operating member 14′ moves the jaw 22 to the left, releasing the rope 4 and disengaging clutch faces on members 8 and 10, as will be understood by reference to the drawings.

In the event that the load is too heavy to permit the release by the levers 13 and 13′, and also to provide for adjustment of the position of the jaws 21 and 22, pins 26 may be withdrawn and the sleeves 23 and 23′ turned, by means of the handles 25, on the worms 9 and 10, respectively, and cause a longitudinal movement, outwardly, of the jaws 21 and 22 respectively.

What I claim as new and desire to secure by Letters Patent is:—

1. A tackle-block comprising a frame and a number of pulleys carried thereby, a shaft to which said pulleys are secured, a pair of clutch members on each side of said frame, one of each of said pairs of clutch members being secured to said shaft and the other being slidably mounted for longitudinal movement and rotatable on said shaft, a pair of gripping jaws each carried by one of said last named clutch members, and means for moving said jaws inwardly when said clutch members are engaged.

2. A tackle-block comprising a frame and a number of pulleys carried thereby, a shaft to which said pulleys are secured, an exteriorly threaded sleeve slidably mounted for longitudinal movement on said shaft but rotatable independently thereof, one end of said sleeve being provided with a clutch, a clutch member attached to said shaft and adapted to be engaged with the clutch on said sleeve, a spring normally holding said clutch members in engagement to cause a concurrent rotation of said sleeve, shaft and pulleys in one direction while permitting a rotation of said shaft and pulleys in the opposite direction independently of said sleeve, and a gripping jaw operatively connected with said sleeve and adapted to be moved longitudinally when said sleeve is rotated.

3. The combination with a tackle-block comprising a frame, pulleys and operating rope, of a shaft upon which said pulleys are secured, worm members positioned on said shaft, clutch members mounted on said shaft adapted to connect and rotate said worm members therewith in one direction, gripping jaws operated by said worm members, and means for rendering said clutch members inoperative to rotate said worm members.

4. The combination with a tackle-block comprising a frame, pulleys and operating rope, of a shaft upon which said pulleys are secured, worm members positioned on said shaft, clutch members mounted on said shaft adapted to connect and rotate said worm members therewith in one direction, gripping jaws operated by said worm members, and means for moving said worm members out of operative engagement with said clutch members.

Signed at New York city, in the county of Queens and State of New York this 20th day of January, A. D. 1930.

CHARLES F. JANSSEN.